(No Model.)

C. L. KELLEY.
THILL COUPLING BOLT.

No. 502,972.

Patented Aug. 8, 1893.

WITNESSES:
J. A. Bergstrom
C. Sedgwick

INVENTOR:
C. L. Kelley
BY
Munn & Co.
ATTORNEYS

UNITED STATES PATENT OFFICE.

CALHOUN L. KELLEY, OF KENNETT, MISSOURI, ASSIGNOR OF TWO-THIRDS TO CHARLES O. HOFFMAN AND JOEL P. TRIBBLE, OF SAME PLACE.

THILL-COUPLING BOLT.

SPECIFICATION forming part of Letters Patent No. 502,972, dated August 8, 1893.

Application filed January 7, 1892. Serial No. 417,266. (No model.)

*To all whom it may concern:*

Be it known that I, CALHOUN L. KELLEY, of Kennett, in the county of Dunklin and State of Missouri, have invented a new and Improved Shackle-Bolt, of which the following is a full, clear, and exact description.

My invention relates to improvements in shackle bolts, and the object of my invention is to produce an extremely cheap and simple form of bolt which is specially adapted to fasten the thills or poles of vehicles to the axles, but which may be used as a shackle bolt or coupling pin for any similar couplings, and which is adapted to hold the parts securely together, and also to be quickly and easily removed.

To this end, my invention consists in a shackle bolt, the construction of which will be hereinafter described and claimed.

Reference is to be had to the accompanying drawings forming a part of this specification, in which similar figures of reference indicate corresponding parts in all the views.

Figure 1:
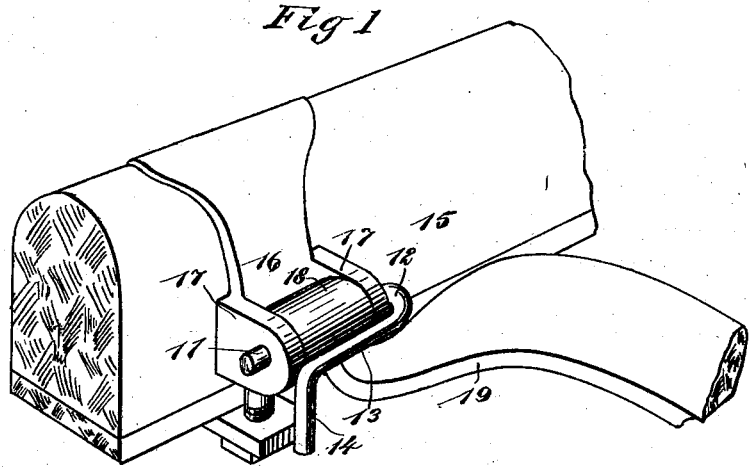
Figure 2:
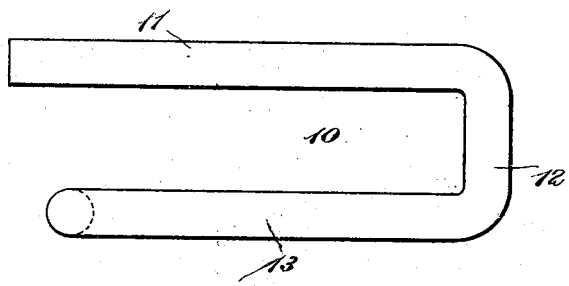
Figure 3:
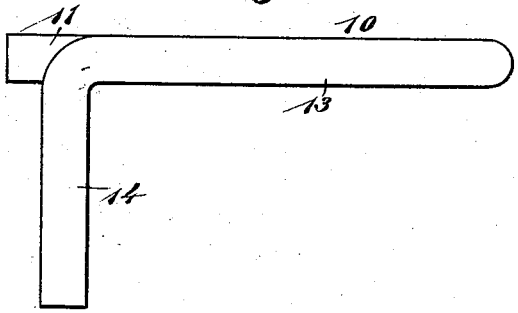

Figure 1 is a perspective view of the bolt as applied to a thill coupling. Fig. 2 is a plan view of the bolt; and Fig. 3 is a side elevation of the same.

The bolt 10, has a body which is of a substantially U-shape, one member 11 being perfectly straight and adapted to extend through the holes in the couplings, as hereinafter described, and this member at one end is bent at a right angle at 12, and extends parallel with the member 11, but is somewhat shorter, and this member 13 at its outer end is bent downward at a right angle to form the terminal arm 14, which arm is perpendicular to the plane of the parallel members 11 and 13. The function of the arm 14 is to lock the member 11, which serves as a coupling pin, in place so that it cannot be accidentally removed.

In Fig. 1, I have shown an axle 15 provided with a common form of clip 16, having forwardly-projecting parallel perforated ears 17, of the usual kind, adapted to receive the knuckle 18 of a thill-iron 19, and the member 11 of the shackle bolt is adapted to extend through the perforated ears and through the bore of the knuckle 18. When in this position, the member 13 will extend through the front of the coupling and parallel with the member 11, and the member 14 will extend downward on one side of the thill and thill-iron, so as to prevent the accidental displacement of the shackle bolt.

To apply the bolt, it is held so that the arm 14 will be above the coupling, and the member 11 of the bolt is pushed into place, after which the arm 14 is turned down on one side of the thill-iron and thill, and the weight of the arm will hold it securely in place. To remove the bolt this operation is reversed, the arm 14 being raised, and the member 11 being slipped out of its position.

From the foregoing description it will be seen that this shackle bolt may be used for uniting the parts of any coupling substantially similar to a thill coupling.

Having thus described my invention, I claim as new and desire to secure by Letters Patent—

The combination with the clip having the ears with apertures therein and the thill iron formed with a knuckle with an aperture therein aligned with the apertures in the ears, of the bolt consisting of the two parallel members 11 and 13, and the downwardly extending arm 14, at right angles thereto, the member 11 passing loosely through the apertures in said ears and knuckle, and the member 13 and arm 14, resting upon the top and one side of the thill iron and moving therewith substantially as described.

CALHOUN L. KELLEY.

Witnesses:
JAMES HOLT,
B. D. HICKS.